US007912973B2

(12) United States Patent
Feingold et al.

(10) Patent No.: US 7,912,973 B2
(45) Date of Patent: Mar. 22, 2011

(54) MESSAGE EXCHANGE PROTOCOL EXTENSION NEGOTIATION

(75) Inventors: Max A. Feingold, Bellevue, WA (US); David E. Langworthy, Kirkland, WA (US); James E. Johnson, Bellevue, WA (US); John D. Doty, Seattle, WA (US); Michael R. Clark, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1325 days.

(21) Appl. No.: 11/004,528

(22) Filed: Dec. 3, 2004

(65) Prior Publication Data

US 2006/0123128 A1 Jun. 8, 2006

(51) Int. Cl.
*G06F 15/16* (2006.01)
(52) U.S. Cl. ...................................................... 709/230
(58) Field of Classification Search .................... 709/201
See application file for complete search history.

(56) References Cited

U.S. PATENT DOCUMENTS

| 5,546,549 | A  | * | 8/1996  | Barrett et al. ................. 710/305 |
| 5,793,983 | A  | * | 8/1998  | Albert et al. .................. 709/239 |
| 5,870,549 | A  | * | 2/1999  | Bobo, II ....................... 709/206 |
| 6,317,777 | B1 | * | 11/2001 | Skarbo et al. ................. 709/204 |
| 6,615,373 | B2 | * | 9/2003  | Elko et al. ...................... 714/47 |
| 6,671,367 | B1 |   | 12/2003 | Graf et al. ..................... 379/229 |
| 6,721,333 | B1 | * | 4/2004  | Milton et al. .................. 370/469 |
| 6,856,993 | B1 | * | 2/2005  | Verma et al. ................... 707/101 |
| 7,409,716 | B2 | * | 8/2008  | Barnett et al. ................... 726/23 |
| 7,509,651 | B2 | * | 3/2009  | Catania et al. ................. 719/316 |
| 7,590,843 | B1 | * | 9/2009  | Khalil et al. ................... 713/171 |
| 2001/0020243 | A1 | * | 9/2001  | Koppolu et al. ............... 707/513 |
| 2002/0004820 | A1 | * | 1/2002  | Baldwin et al. ............... 709/206 |
| 2002/0056047 | A1 | * | 5/2002  | Lehman ......................... 713/200 |
| 2002/0057701 | A1 | * | 5/2002  | Mills ............................ 370/401 |
| 2003/0037033 | A1 | * | 2/2003  | Nyman et al. ..................... 707/1 |
| 2003/0112789 | A1 | * | 6/2003  | Heinonen et al. ............. 370/349 |
| 2003/0212827 | A1 | * | 11/2003 | Saha et al. ...................... 709/247 |
| 2004/0013118 | A1 | * | 1/2004  | Borella ......................... 370/395.2 |
| 2004/0107360 | A1 | * | 6/2004  | Herrmann et al. ............. 713/201 |
| 2004/0128369 | A1 |   | 7/2004  | Moreau et al. ................. 709/220 |
| 2004/0157556 | A1 | * | 8/2004  | Barnett et al. ................. 455/41.2 |

(Continued)

FOREIGN PATENT DOCUMENTS

EP 1280301 A1 1/2003

OTHER PUBLICATIONS

Cabrera, Luis Felip, et al. *Web Services Coordination (WS-Coordination)*, BEA Systems, International Business Machines Corporation, Microsoft Corporation, Nov. 2004.

(Continued)

*Primary Examiner* — Krista M. Zele
*Assistant Examiner* — Tariq S Najee-Ullah
(74) *Attorney, Agent, or Firm* — Merchant & Gould PC (57) ABSTRACT

A mechanism for negotiating a relatively transport agnostic communication protocol for use in accomplishing a distributed activity. The potential protocols subject to negotiation may be, for example, extensions to Web Services Coordination. In that case, when the initiator creates a transaction, the initiator also negotiates the desired protocol with its transaction manager. The transaction manager and any other participants in the transaction will then follow that negotiated protocol when communicating with the transaction manager. The protocol may be selected to improve performance and may be tailored to existing needs and capabilities.

19 Claims, 6 Drawing Sheets

U.S. PATENT DOCUMENTS

2005/0216736 A1* 9/2005 Smith .......................... 713/168
2006/0075277 A1* 4/2006 Johnson et al. ................... 714/4
2006/0080117 A1* 4/2006 Carr et al. ........................ 705/1

OTHER PUBLICATIONS

First Office Action, dated Aug. 21, 2009, issued in Chinese Application No. 200510118873.3, 14 pp.
Second Office Action, dated Jul. 6, 2010, issued in Chinese Application No. 200510118873.3, 9 pp.

European Search Report, dated May 12, 2006, issued in European Application No. 05110465.1, 8 pp.
Office Action, dated Jan. 8, 2007, issued in European Application No. 05110465.1, 1 pp.
Response to Office Action, dated May 16, 2007, issued in European Application No. 05110465.1, 13 pp.
Decision to Grant a European Patent, dated Dec. 3, 2009, issued in European Application No. 05110465.1, 2 pp.

* cited by examiner

Initiator
201

Remote
Application
211

Transaction
Manager TM1
202

Transaction
Manager TM2
212

MESSAGE EXCHANGE PROTOCOL EXTENSION NEGOTIATION

BACKGROUND OF THE INVENTION

1. The Field of the Invention

The present invention relates to network technology; and more specifically, to mechanisms for negotiating extensions to message exchange protocols.

2. Background and Related Art

Computing technology has transformed the way we work and play. Computing systems now take a wide variety of forms including desktop computers, laptop computers, tablet PCs, Personal Digital Assistants (PDAs), household devices and the like. In its most basic form, a computing system includes system memory and one or more processors. Software in the system memory may be executed by the processor to direct the other hardware of the computing system to perform desired functions.

Networking technologies enable computing systems to communicate even over vast distances, thereby expanding on computer functionality. For example, networking technologies enable such applications as e-mail, web browsing, file transfer, instant messaging, electronic whiteboarding, network collaboration, and the like. Accordingly, computer networks enable widespread communication and information access.

Often network communication protocols define a pattern of message exchange that may be used to accomplish a particular activity. The message pattern may be as simple as a one way transmission of a single message, or may be quite complex involving numerous messages and numerous communication nodes. Regardless of complexity, such network communication protocols will be referred to herein as "message exchange protocols".

Message exchange protocols expressly define rules regarding the types and forms of messages to be exchanged, the ordering of messages in the exchange, the role of a particular communication node in transmitting or receiving certain message types, and the like. Despite such rules, message exchange protocols often permit additional rules to be defined which are consistent with the basic message exchange protocol, but not expressly defined by the basic protocol. These additional rules may be referred to herein as "extensions" to the basic message exchange protocol.

Examples of a more complex message exchange protocol is Web Services Coordination (WS-Coordination) and Web Services Atomic Transactions (WS-AT), which use Simple Object Access Protocol (SOAP)_envelopes to exchange messages potentially even across transport-level barriers using what is often referred to as "SOAP-tunneling". For example, a HyperText Transport Protocol (HTTP) computing system may transmit a SOAP envelope within an HTTP message to another HTTP computing system. Along the way, however, the SOAP envelope may be placed in other messages that follow different transport protocols, such as, for example, Message Queues (MQ), Simple Mail Transport Protocol (SMTP), CORBA/IIOP, or the like. Accordingly, SOAP message are considered relatively transport agnostic.

WS-Coordination describes an extensible framework for providing protocols that coordinate the actions of distributed applications. Such coordination protocols are used to support a number of applications, including those that need to reach consistent agreement on the outcome of distributed activities. WS-Coordination enables an application service to create a context needed to propagate an activity to other services and to register for coordination protocols. The framework enables existing transaction processing, workflow, and other systems for coordination to hide their proprietary protocols and to operate in a heterogeneous environment.

Figure 4A:
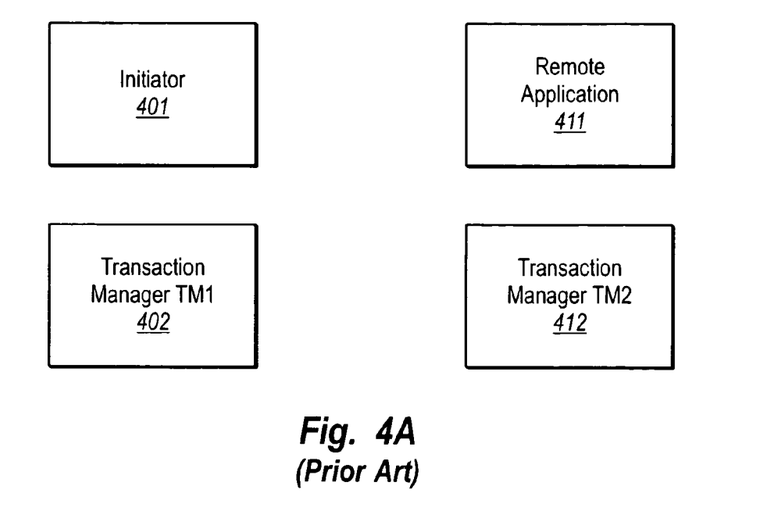
FIG. 4A illustrates a conventional network environment in which the Web Services Coordination protocol may be implemented.
Figure 4B:
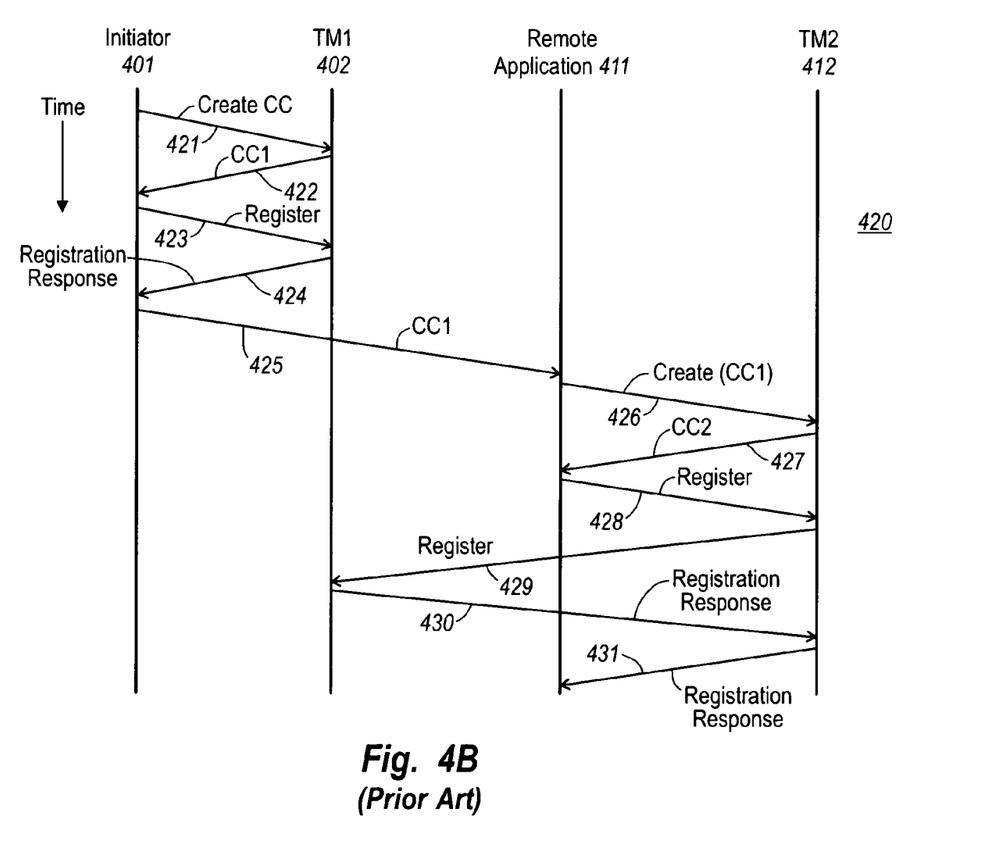
FIG. 4B illustrates a timing diagram illustrating the timing of various message flows in accordance with conventional Web Services Coordination (WS-Coordination) Protocol.

FIG. 4A illustrates a network environment 400 in which WS-Coordination may be employed. Four computing entities are illustrated; an initiator 401, the transaction manager 402 (also referred to as TM1) associated with the initiator 401, a remote application 411, and the transaction manager 412 (also referred to as TM2) associated with the remote application 411. FIG. 4B illustrates a timeline diagram 420 showing a message exchange in accordance with a typical WS-Coordination message exchange pattern.

The initiator 401 is to initiate an activity that requires the cooperative interaction of the initiator 401, remote application 411, and their respective transaction managers 402 and 412. To do so, the initiator sends a CreateCoordinationContext message to its transaction manager TM1 as represented by arrow 421 in FIG. 4B. This message may include an endpoint reference that includes all addressing information needed for the transaction manager TM1 to properly address the requesting service at the initiator. An "endpoint reference" is defined by a Web Services protocol called WS-Addressing.

In response, the transaction manager TM1 sends a CreateCoordinationContextResponse to the initiator as represented by arrow 422. The Response 422 includes what is referred to as a Coordination Context (identified by CC1 in FIG. 4B) for transaction manager TM1. The Coordination Context CC1 includes all information needed for a computing entity to register in that activity. The response may also include an endpoint reference that includes all addressing information needed for the initiator to address the registration service at the transaction manager TM1.

The initiator 401 uses the coordination context CC1 to construct a Register request, and then sends the Register request to the transaction manager TM1 as represented by arrow 423. This Register request includes an endpoint reference to the protocol service at the initiator 401. Upon registering the initiator 401 in the activity, the transaction manager TM1 sends a RegistrationResponse to the initiator 401 as represented by the arrow 424. This response includes an endpoint reference to the protocol service at the transaction manager TM1. Thus, upon receiving the RegistrationResponse, the initiator and the transaction manager TM1 may exchange protocol level messages.

For distributed activities, the initiator may want other remote applications (such as remote application 411 in FIGS. 4A and 4B) to also register in the activity. The initiator 401 thus sends the Coordination Context CC1 for transaction manager TM1 to any such remote application 411 as represented by the arrow 425. For clarity, only one remote application 411 will be described as being involved in the activity, although WS-Coordination allows registration of multiple remote applications in the same manner as described for remote application 411.

The remote application 411 then sends a CreateCoordinationContext request to its transaction manager TM2 as represented by arrow 426. The remote application also supplies the coordination context CC1 needed to register with in the activity with the transaction manager TM1. This request may include an endpoint reference to the requesting service in the remote application.

The transaction manager TM2 responds with a CreateCoordinationContextResponse as represented by arrow 427. This response may include another CoordinationContext CC2 which includes information needed to register with the transaction manager TM2. The response may also include an endpoint reference to the registration service within the transaction manager TM2.

The remote application 411 uses the coordination context CC2 to construct a Register request, and then sends the Register request to the transaction manager TM2 as represented by arrow 428. This request may include an endpoint reference to the protocol service on the remote application 411.

Recognizing that the remote application has already provided the coordination context CC1 for the first transaction manager TM1, the second transaction manager TM2 knows to register with the first transaction manager TM1 on behalf of the remote application. The second transaction manager TM2 thus uses the coordination context CC1 to construct a Register request, and then transmits the Register request to the first transaction manager TM1 as represented by the arrow 429. This request includes an endpoint reference to the protocol service provided by the transaction manager TM2.

The first transaction manager TM1 registers the second transaction manager TM2 in the activity, and then provides a RegistrationResponse message to the second transaction manager TM2 as represented by arrow 430. The RegistrationResponse message includes an endpoint reference to the protocol service provided by the transaction manager TM1. Upon receiving this response, the transaction managers TM1 and TM2 may send post-registration protocol level messages to each other.

The second transaction manager TM2 then sends a RegistrationResponse message to the remote application as represented by arrow 431. This response includes an endpoint reference to the protocol service provided by the transaction manager TM2. Upon receiving this response, the transaction manager TM2 and the remote application 411 may exchange post-registration protocol level messages with each other.

After this interaction, three coordinator/participant relationships have been created. The relationship is defined by sending and receiving a Register request. The computing entity that sends a Register request is a "participant" in the relationship, while the computing entity that receives that Register request is a "coordinator" in the relationship. Accordingly, in one relationship, the initiator 401 is a participant, and the transaction manager TM1 is the coordinator. In a second relationship, the remote application 411 is a participant, and the transaction manager TM2 is a coordinator. In a third relationship, the transaction manager TM2 is a participant, and the transaction manager TM1 is a coordinator. It is this third relationship that involves the most complex interaction and thus will be the focus of the WS-Atomic Transaction summary, which will now be provided.

WS-Atomic Transaction is used to coordinate activities having a short duration and executed within limited trust domains. They are called atomic transactions because they have an "all or nothing" property. WS-Atomic Transaction defines, among other things, a two phase commit protocol that permits a transaction to be prepared in the first phase, followed by a commit in the second phase.

Figure 5:
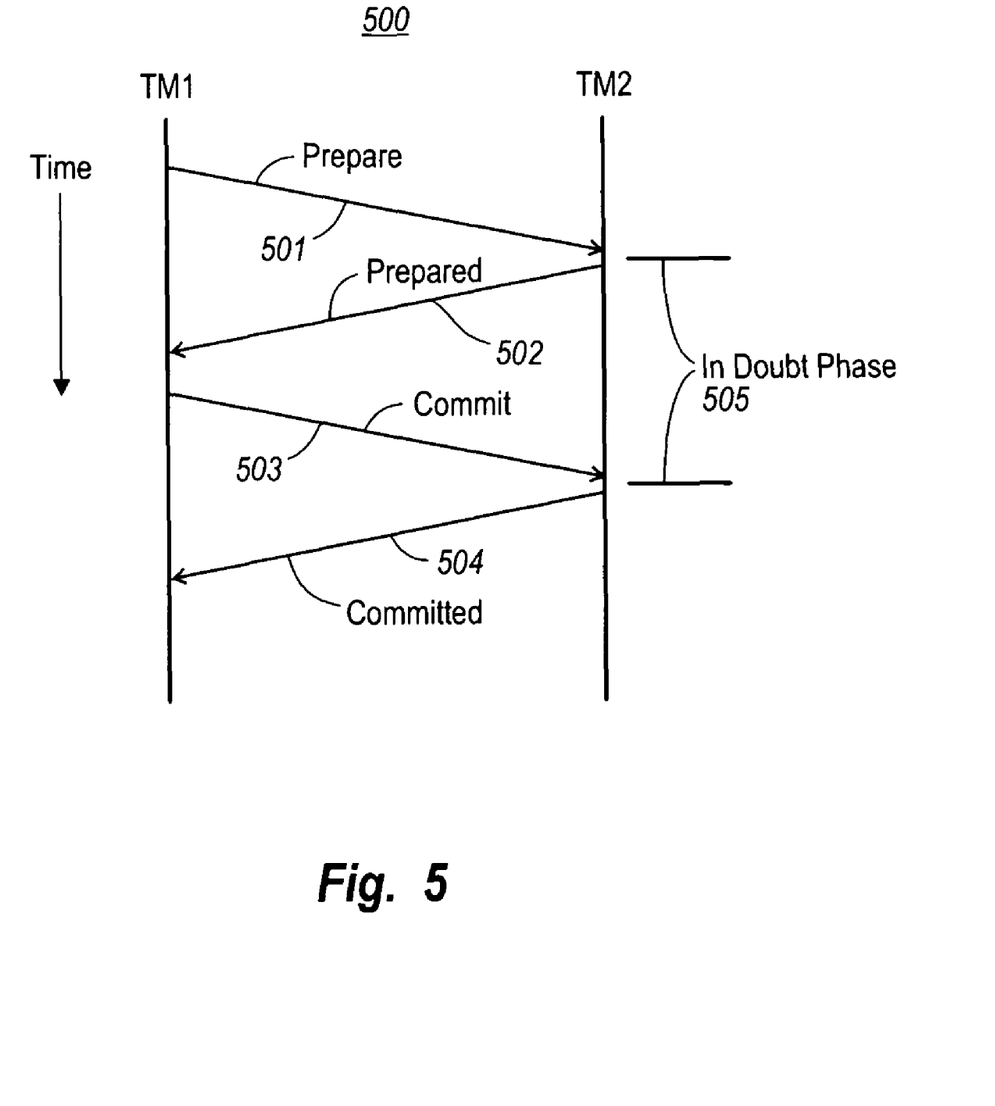
FIG. 5 illustrates a timing diagram illustrating the timing of various message flows associated with a two phase commit transaction model defined by the conventional Web Services Atomic Transaction (WS-AT) protocol.

After the WS-Coordination based messaging exchange described above, the initiator 401 and the remote application 411 may engage in a number of application level message exchanges that accomplish a particular transaction. When both parties are finished the message exchange and associated processing, the initiator 401 will request of the transaction manager TM1 that the transaction be perfected. FIG. 5 illustrates a time diagram 500 showing a two-phase commit message exchange that would then occur between the two transaction managers TM1 and TM2 to complete the transaction.

The first transaction manager TM1 first sends a prepare message to the second transaction manager TM2 as represented by arrow 501. Upon receiving this message, the transaction manager TM2 does all processing needed to atomically commit the transaction upon a suitable instruction. The transaction manager TM2 then sends a prepared message to the first transaction manager TM1 as represented by arrow 502, thus completing the first phase of the two-phase commit pattern. The transaction manager TM2 then enters an in-doubt phase 505 meaning that the transaction manager TM2 does not know whether the transaction will be committed or aborted.

If the first transaction manager TM1 elects to commit the transaction, the first transaction manager TM1 then sends a commit message to the second transaction manager TM2 as represented by arrow 504. The second transaction manager TM2 then commits the transaction, and sends a committed message to the first transaction manager TM1 to thereby inform the first transaction manager TM1 that the transaction is complete.

The WS-Coordination and WS-Atomic Transaction specifications are quite powerful in that they allow for any number of distributed applications to register for and cooperatively interact to accomplish particular activities. Furthermore, the activity may be accomplished as a transaction thereby avoiding state inconsistencies between the various parties in the activities.

Although WS-Coordination and WS-Atomic Transaction are powerful, they are not perfect. While WS-Coordination and WS-Atomic Transaction are extensible, they provide no specifically expressed means for negotiating extensions to the protocols to improve upon the basic WS-Coordination and WS-Atomic Transaction protocols.

Accordingly, what would be advantageous are mechanisms for negotiating extensions to message exchange protocols, whether the message exchange protocols involve Web Services protocols such as WS-Coordination or WS-AT, or other message exchange protocols. It would further be advantageous if the basic message exchange protocol could be used as a fall back to should one or more of the parties not be aware of the negotiating mechanism since some computing entities (especially in a distributed environment) may implement the extension negotiating procedure described herein while others may not.

BRIEF SUMMARY OF THE INVENTION

The foregoing problems with the prior state of the art are overcome by the principles of the present invention, which are directed towards a mechanism for negotiating extensions to a message exchange protocol to use when engaging in a particular message exchange between two computing entities. If negotiation is not possible, then the basic message exchange protocol is used without implementing extensions. Accordingly, if effective negotiation of extensions is possible, the improved performance, efficiency, or accuracy associated with those extensions may be realized. On the other hand, if negotiation is not possible, the computing entities may still communicate using the basic message exchange protocol. In one embodiment, the potential extensions may be for the WS-Coordination or WS-AT protocols, although this is not required.

One of the two computing entities (referred to as a "first" computing entity to simply distinguish one computing entity from another) constructs one or more extension-identifying data structures that identify one or more extensions that the first computing entity is capable of implementing when communicating in a message exchange with the other computing entity (referred to as a "second computing entity"). These one of more extension-identifying data structures may also be referred to herein as "first one or more extension-identifying data structures" or "first extension-identifying data structure(s)" for short. Likewise, the one or more extensions may be referred to herein as "first set of one or more extensions" or "first extension(s)". The first computing entity then constructs a message (referred to herein as a "first message") that includes the first extension-identifying data structure(s). The first computing system subsequently sends the first message to the second computing entity.

Upon receiving this first message, if the second computing entity supports this negotiation procedure, the second computing entity may likewise construct one or more extension-identifying data structures that identify one or more extensions that the second computing entity is capable of implementing when communicating in a message exchange with the first computing entity. These one or more extension-identifying data structures may also be referred to herein as "second one or more extension-identifying data structures" or "second extension-identifying data structure(s)" for short. Likewise, the one or more extensions may be referred to herein as "second set of one or more extensions" or "second extension(s)". The second computing entity then constructs a second message including the second extension-identifying data structure(s), and sends the second message to the first computing entity.

The second computing entity also reads the first extension-identifying data structure(s) from the first message, and identifies one or more extensions that are actually to be used in the message exchange based on the first extension(s) supported by the first computing entity and the second extension(s) supported by the second computing entity.

Meanwhile, upon receiving the second message, the first computing entity reads the second extension-identifying data structure(s) from the second message, and identifies the one or more extensions that are actually to be used in the message exchange based on the first extension(s) supported by the first computing entity and the second extension(s) supported by the second computing entity.

In this manner, the two computing entities may negotiate many different possible extensions (if both computing systems are capable of such negotiation) to thereby provide improved implementation of the message exchange pattern. On the other hand, if the second computing entity is not capable of such negotiation, then the computing entities simply communicate using the basic message exchange protocol.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to a mechanism for negotiating whether or not extensions (and what extensions) to a message exchange protocol are to be used in accomplishing a distributed activity. The negotiation mechanism falls back to the basic message exchange protocol should one of the parties in the message exchange not be aware of the extension negotiation mechanism. The potential message exchange protocols subject to negotiation may be, for example, extensions to Web Services Coordination (WS-Coordination) or Web Services Atomic Transaction (WS-AT). The negotiated protocol extensions may be selected to improve performance and may be tailored to existing needs and capabilities. Furthermore, the transaction manager may use different extensions for different transactions.

Prior to describing the details of the present invention, a suitable computing architecture that may be used to implement the principles of the present invention will first be described with respect to FIG. 1. Then, a suitable network environment in which the principles of the present invention may be implemented will be described with respect to FIG. 2. The negotiating mechanism in accordance with the principles of the present invention will be described with respect to the flowchart of FIG. 3A, and the network environment of FIG. 2. Finally, various examples of functions that may be negotiated using this mechanism will be described.

In the description that follows, embodiments of the invention are described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the principles of the invention are being described in the foregoing context, it is not meant to be limiting as those of skill in the art will appreciate that several of the acts and operations described hereinafter may also be implemented in hardware.

Turning to the drawings, wherein like reference numerals refer to like elements, the principles of the present invention are illustrated as being implemented in a suitable computing environment. The following description is based on illustrated embodiments of the invention and should not be taken as limiting the invention with regard to alternative embodiments that are not explicitly described herein.

Figure 1:
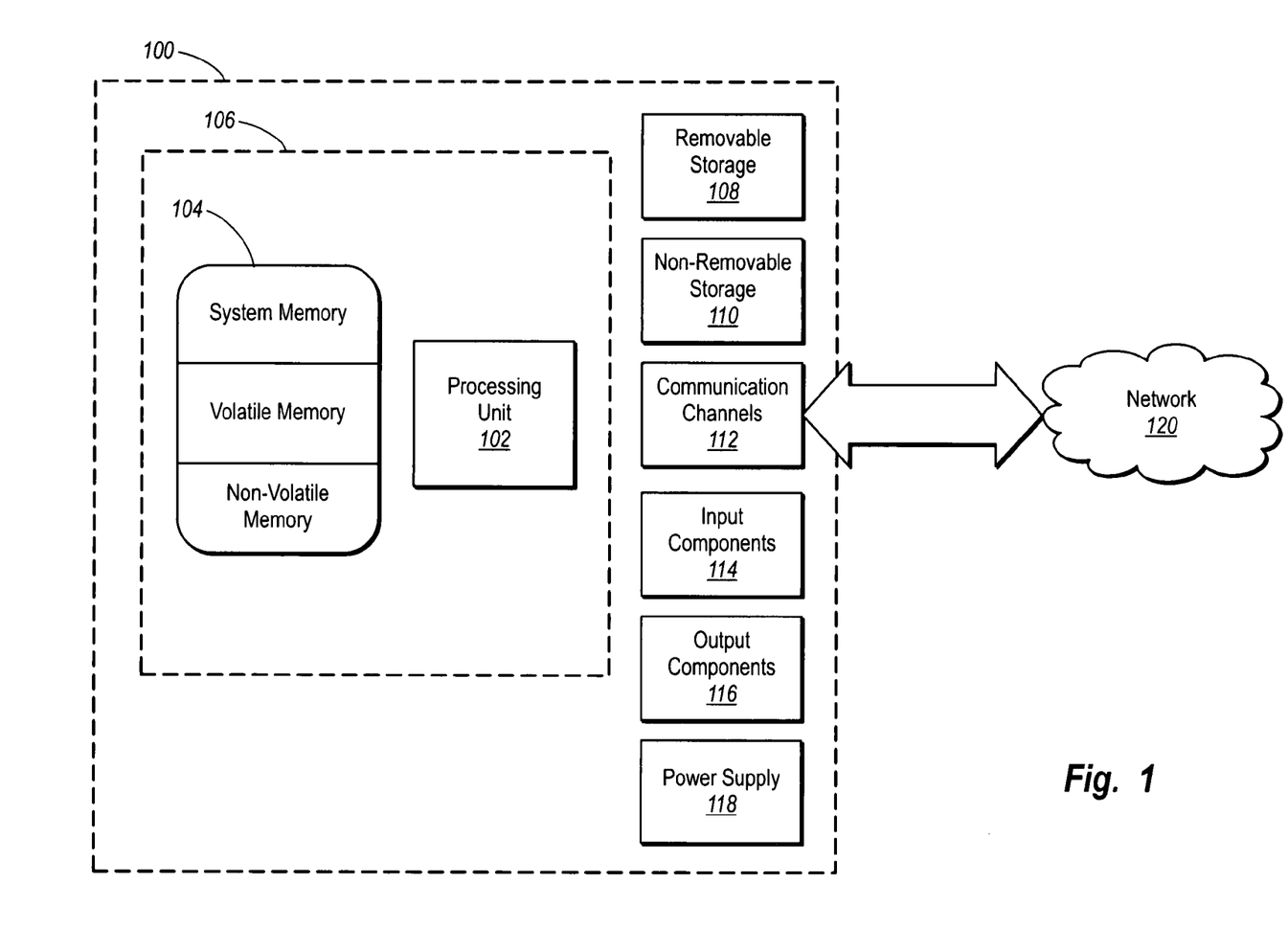
FIG. 1 illustrates a suitable computing system that may implement features of the present invention.

FIG. 1 shows a schematic diagram of an example computer architecture usable for these devices. For descriptive purposes, the architecture portrayed is only one example of a suitable environment and is not intended to suggest any limitation as to the scope of use or functionality of the invention. Neither should the computing systems be interpreted as having any dependency or requirement relating to any one or combination of components illustrated in FIG. 1.

The principles of the present invention are operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing system 100 typically includes at least one processing unit 102 and memory 104. The memory 104 may be volatile (such as RAM), non-volatile (such as ROM, flash memory, etc.), or some combination of the two. This most basic configuration is illustrated in FIG. 1 by the dashed line 106. In this description and in the claims, a "computing system" is defined as any hardware component or combination of hardware components capable of executing software, firmware or microcode to perform a function. The computing system may even be distributed to accomplish a distributed function.

The storage media devices may have additional features and functionality. For example, they may include additional storage (removable and non-removable) including, but not limited to, PCMCIA cards, magnetic and optical disks, and magnetic tape. Such additional storage is illustrated in FIG. 1 by removable storage 108 and non-removable storage 110. Computer-storage media include volatile and non-volatile, removable and non-removable media implemented in any method or technology for storage of information such as computer-readable instructions, data structures, program modules, or other data. Memory 104, removable storage 108, and non-removable storage 110 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing system.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated.

Computing system 100 may also contain communication channels 112 that allow the host to communicate with other systems and devices over, for example, network 120. Communication channels 112 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

The computing system 100 may also have input components 114 such as a keyboard, mouse, pen, a voice-input component, a touch-input device, and so forth. Output components 116 include screen displays, speakers, printer, etc., and rendering modules (often called "adapters") for driving them. The computing system 100 has a power supply 118. All these components are well known in the art and need not be discussed at length here.

Figure 2:
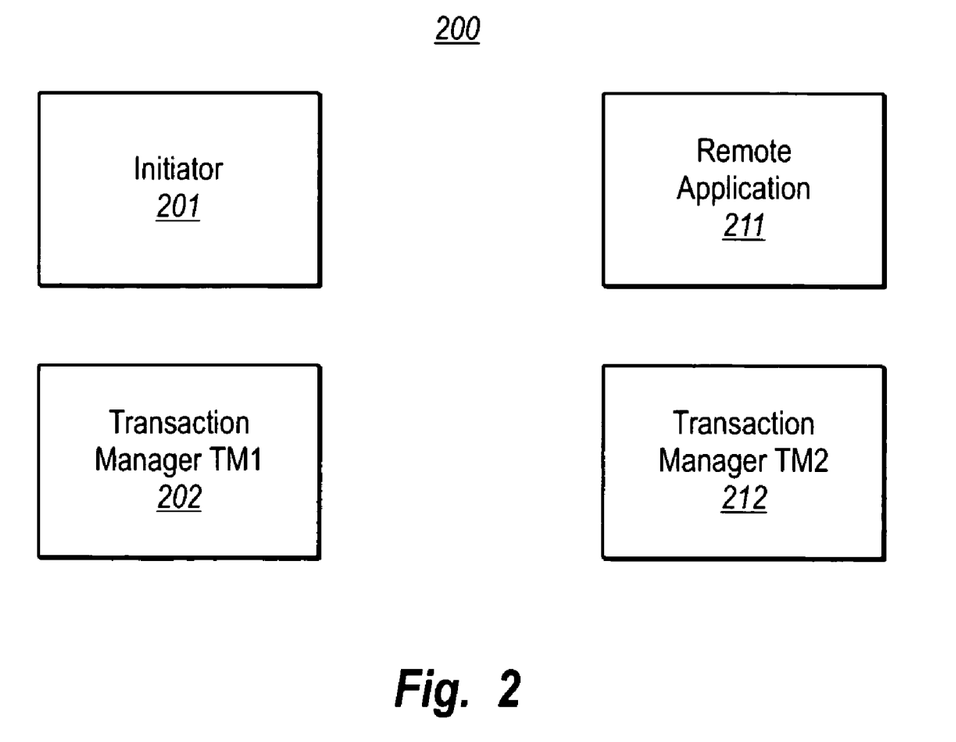
FIG. 2 schematically illustrates a network environment in which a relatively transport-agnostic communication protocol may be negotiated to accomplished a distributed activity.

FIG. 2 illustrates a network environment 200 that includes an initiator computing entity 201 that initiates a distributed activity coordinated by a transport-agnostic coordination protocol, a first transaction manager 202 associated with the initiator 201, a remote application computing entity 211 that participates in the distributed activity, and a second transaction manager 212 associated with the remote application 211. This environment is particularly applicable to WS-Coordination and WS-AT, although the principles of the present invention are not limited to these particular message exchange protocols. The network environment 200 of FIG. 2 is similar to the prior art network environment 400 of FIG. 4A, which is labeled as "Prior Art". However, FIG. 2 is not also labeled as "Prior Art" because the various computing entities 201, 202, 211 and 212 are modified to perform the principles of the present invention, and are thus not conventional computing entities.

In this description and in the claims, a "computing entity" is defined as any computing system or software component or component(s) running on the computing system. A "computing system" is defined as any hardware component or combination of hardware component that is capable of executing software. The computing system may be distributed in which case the computing system may encompass multiple computing systems that also fall within the definition of computing system as broadly defined herein. An example of a computing system has been described with respect to FIG. 1. However, the definition of a computing system as set forth herein is by no means so limited. Referring to FIG. 2, any one or combination (or even all) of computing entities may run on a single computing system. However, in one possible network environment, initiator computing entity 201 and transaction manager computing entity 202 run on one computing system, while remote application computing entity 211 and transaction manager computing entity 212 run on another computing system.

The various computing entities 201, 202, 211 and 212 shown with respect to FIG. 2 may follow conventional transport agnostic coordination and transaction protocols such as, for example, WS-Coordination and WS-AT summarized above. As used herein, the term "WS-Coordination" refers to the Web Services Coordination (WS-Coordination) specification published by Microsoft Corporation in November 2004. As used herein, the terms "WS-Atomic Transaction", "WS-AtomicTransaction", "WS-AT", refer to the Web Services Atomic Transaction (WS-AtomicTransaction) specification published by Microsoft Corporation in November 2004.

However, the various computing entities 201, 202, 211 and 212 in FIG. 2 may not only be capable of communicating using a basic message exchange protocol such as, for example, WS-Coordination, and WS-AT, but may also implement one or more extensions to these basic message exchange protocols. Concurrent with or prior to the initiator 201 registering in a distributed activity, the initiator 201 and transaction manager 202 may negotiate appropriate extensions of WS-Coordination and WS-AT to use in accomplishing the distributed activity.

FIG. 3 illustrates a flowchart of a method 300 for the initiator 201 and transaction manager 202 to negotiate extensions to a message exchange protocol in accordance with the principles of the present invention. Acts performed by the initiator 201 are listed in the left column of FIG. 3 under the heading "Initiator". Acts performed by the transaction manager 202 are listed in the right column of FIG. 3 under the heading "Transaction Manager". However, the principles of the present invention extend beyond the negotiation of extensions to WS-Coordination and WS-AT, but apply to the negotiation of extensions for any extensible message exchange protocol. Accordingly, to demonstrate this generality, the initiator may more generally be referred to as a "first computing entity", and the transaction manager may instead be referred to as a "second computing entity". As will now be described, this negotiation procedure falls back to the basic message exchange protocol without extensions should one of the computing entities be incapable of negotiating extensions. Accordingly, the distributed activity may still be accomplished even if the extensions are not used.

Figure 3A:
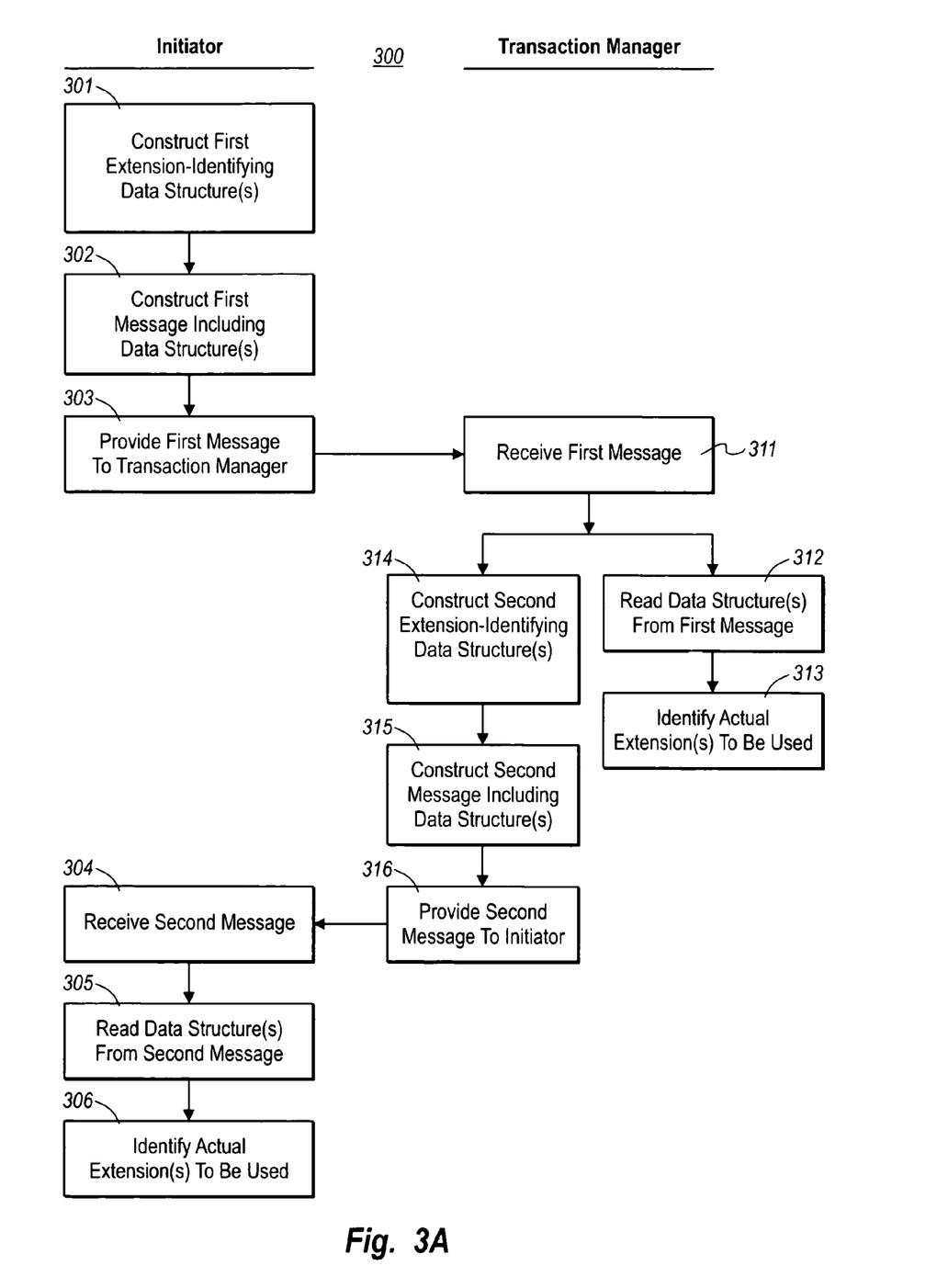
FIG. 3A illustrates a flowchart of a method for negotiating extensions to a message exchange pattern in accordance with the principles of the present invention.

Following the method 300 shown in FIG. 3, the initiator 201 (also called herein a "first computing entity" for generality) first constructs one or more extension-identifying data structures (also called herein "first one or more extension-identifying data structures" or "first extension-identifying data structure(s) for short") that include information identifying one or more extensions (also called herein "first set of one or more extensions" or "first extension(s)") that the first computing entity is capable of implementing when communicating in the message exchange pattern with the second computing entity (act 301 in FIG. 3A). A representation of the first extension identifying data structure(s) is illustrated as component 300B in FIG. 3B. The "extension-identifying" data structure is simply any data structure that includes sufficient information such that the second computing entity may (if the second computing entity is configured to negotiate extensions) interpret the extensions that the first computing entity is capable of using. This interpretation may be based on the extensions identified in the first message and/or based on information already-known to the second computing system. The precise physical structure of this data structure(s) is not important to the principles of the present invention.

Figure 3B:
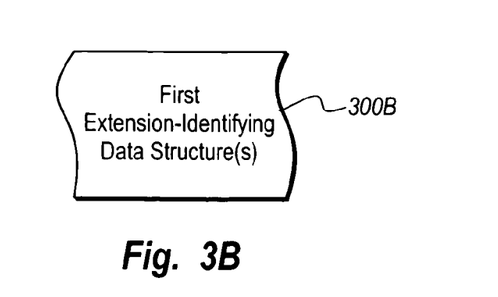
FIG. 3B illustrates a data structure of a first extension-identifying data structure.
Figure 3C:
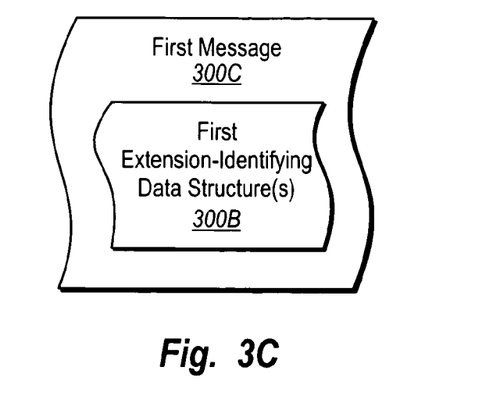
FIG. 3C illustrates a first message that includes the first extension-identifying data structure.

The first computing entity then constructs a first message that includes the first one or more extension-identifying data structure(s) (act 302). An example data structure of this first message is shown in FIG. 3C as first message 300C, which is schematically illustrated as including the first extension-identifying data structure(s) 300B. In one embodiment in which the first computing entity is the initiator 201 and the second computing entity is the transaction manager 202 of FIG. 2, this first message is the CreateCoordinationContext request defined by the WS-Coordination protocol in which the initiator initiates the distributed activity, but with the addition of the first extension-identifying data structure(s) not defined by the WS-Coordination specification. The message may also be the CreateCoordinationContextResponse, or Register request as defined by the WS-Coordination protocol. In another embodiment, this message is generated well in advance of the distributed activity, and may be acquired out-of-band from any message exchange governed by WS-Coordination.

The first computing entity then provides the first message to the second computing system (act 303), whereupon the second computing entity receives the first message (act 311). If the first computing entity and the second computing entity were located in different computers, then this may be accomplished via messaging or remote function calls. If the first and second computing entities are located on the same computer, this may additional be accomplished via a local Application Program Interface (API).

If the second computing entity is capable of negotiating message exchange protocol extensions in accordance with the principles of the present invention, the second computing entity then reads the first extension-identifying data structure (s) from the first message (act 312), and may then identify one or more extensions that will actually be used in the message exchange based on the first extension(s) as well as on the extensions capable of being implemented (and willing to be offered) by the second computing entity (also referred to herein as "the second set of one or more extensions" or simply "the second extension(s)") (act 313).

The first and second computing entity may follow a specific set of rules when making this determination. For example, if the first extension(s) are for a later version of a protocol than the second computing entity supports, the transaction manager may revert to the latest version of the protocol that the second computing entity supports. On the other hand, if the first extension(s) are for an earlier version of a protocol than the second computing system supports, the second computing system may simply use the extensions associated with the earlier version of the protocol.

Alternatively, the second computing entity may decide that the actual extensions to be used will include only those extensions of the first one or more extensions that are supported by the second computing entity. The second computing entity may for any reason also deny certain extensions desired by the first computing entity, even though the second computing entity may support these extensions.

The second computing entity constructs one or more extension-identifying data structures that include information identifying extensions of the message exchange protocol supported by the second computing entity (also referred to herein as "second one or more extension-identifying data structures" or "second extension-identifying data structure(s)") (act 314). A representation of the second extension-identifying data structure(s) is illustrated as component 300D in FIG. 3D. The "second one or more extension-identifying data structures" is simply any data structure that includes sufficient information such that the first computing system may interpret the extensions that are supported and are willing to be offered by the second computing entity. This interpretation may be based on information within the second extension-identifying data structure(s), or based on information that is already known to the first computing entity. The precise physical structure of this data structure(s) is not important to the principles of the present invention.

Figure 3D:
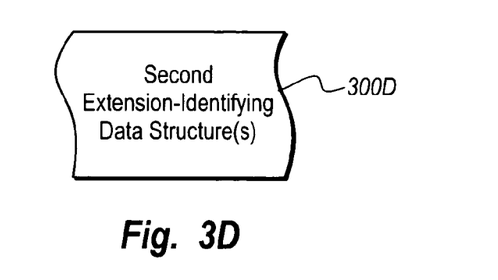
FIG. 3D illustrates a data structure of a second extension-identifying data structure.
Figure 3E:
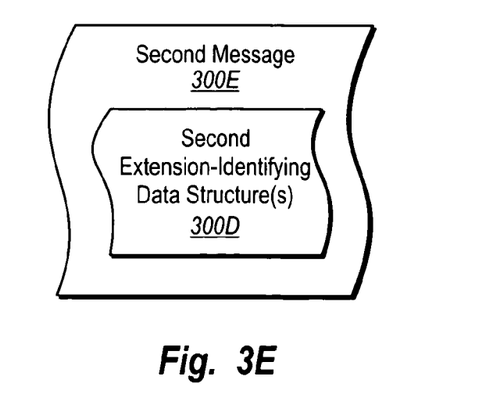
FIG. 3E illustrates a first message that includes the second extension-identifying data structure.

The second computing entity then constructs a second message that includes the second extension-identifying data structure(s) (act 315). An example data structure of this second message is shown in FIG. 3E as second message 300E, which is schematically illustrated as including the second extension-identifying data structure(s) 300D. In one embodiment in which the first computing entity is the initiator 201 of FIG. 2 and the second computing entity is the transaction manager 202 of FIG. 2, this message is the CreateCoordinationContextResponse defined by the WS-Coordination protocol in which the transaction manager responds to a CreateCoordinationContext request provided by the initiator, but with the addition of the second extension-identifying data structure(s) not defined by the WS-Coordination specification. In another embodiment, this second message is generated well in advance of the distributed activity, and may be acquired out-of-band from any message exchange governed by WS-Coordination.

The second computing entity then provides the second message to the first computing entity (act 316), whereupon the first computing entity receives the second message (act 304).

The first computing entity reads the second extension-identifying data structure(s) from the second message (act 305), and then identifies the actual extensions to be used based on the first extension(s) that are supported by the first computing entity and the second extension(s) supported by the second computing entity (act 306).

Accordingly, if the second computing entity is capable of negotiating message exchange protocol extension(s) in accordance with the principles of the present invention, the first and second computing entities may agree upon and use one or more extensions to the message exchange protocol to thereby improve the performance of the message exchange. If, one the other hand, the second computing entity is not capable of negotiating extensions in accordance with the principles of the present invention, the second computing entity would simply ignore the first extension-identifying data structure(s) and simply respond to the first message without including second extension-identifying data structures. The first computing entity may then interpret the absence of such second extension-identifying data structure(s) to mean that the second computing entity does not support extensions at all, and thus the first computing entity would simply fall back to the basic message exchange protocol without extensions. Accordingly, message exchange is enabled at some level even if not all parties to the message exchange are capable of negotiating extensions to the message exchange protocol. By providing the extension-identifying data structure(s) in the endpoint reference, the second computing system may validly ignore these data structures if the second computing entity is not capable of interpreting the data structures. In that case, the second computing entity may still interact with the first computing entity using the basic message exchange protocol.

In one embodiment, the negotiated extensions are unconventional extensions to WS-Coordination and WS-Atomic-Transaction, that allow for improvements in performance, accuracy and interoperability. In that case, the first computing entity described with respect to FIG. 3A may be the initiator 201, and the second computing entity described with respect to FIG. 3A may be the transaction manager 202. In this case, anytime a participant-coordinator relationship is set up as defined by the WS-Coordination protocol, the participant and coordinator may negotiate different extensions to WS-Coordination or WS-AT. This allows the various parties to optimize the message exchange protocol in different ways as appropriate for their capabilities and the link between the computing entities. Several examples of these extensions to WS-Coordination and WS-AT will now be described.

Extension #1

WS-Coordination specifies two round trips in order to first set up distributed activities between the initiator and its transaction manager. Specifically, the initiator sends a CreateCoordinationContext request to the transaction manager. The transaction manager then sends a CreateCoordinationContextResponse to the initiator. This first round trip accomplishes the establishment of the transaction. The initiator then sends a Register request to the transaction manager. The transaction manager then returns a RegistrationResponse to the initiator. This second round trip registers the initiator as having a certain role in the transaction. These two round trips can take significant time.

In accordance with one extension of WS-Coordination which may be negotiated using the method described above with respect to FIG. 3, the initiator and transaction manager may reduce this message exchange to just one round trip. Specifically, the initiator would include the registration information (that is normally included within the Register message) instead within the CreateCoordinationContext request. The transaction manager could likewise include the registration response information (that is normally included within the RegistrationResponse) instead within the CreateCoordinationContextResponse message. This would significantly reduce latency in registering in the distributed activity thereby improving performance.

Extension #2

In a second example extension, the two round trips associated with the conventional two-phase prepare commit transaction specified by WS-AT (see message flow of FIG. 5) may instead be reduced to one round trip. Referring to FIG. 5, the transaction manager TM2 conventionally enters an in-doubt phase 505 from the time that transaction manager TM2 receives a prepare message until the time the transaction manager TM2 receives a commit message.

However, in some cases, the transaction manager TM2 may be the only party in the transaction that actually cares about the transaction result. For instance, perhaps the remote application associated with the transaction manager TM2 is the only party in the transaction other than the initiator. In that case, this second example extension may be negotiated according to the method described with respect to FIG. 3.

In this second example extension, the prepare message 501 (or some other message referred to herein as a SinglePhaseCommit message) is interpreted by the transaction manager TM2 as being a delegation of the decision on whether or not to commit the transaction or abort the transaction. The transaction manager TM2 may report whether or not it has committed or aborted the transaction to the transaction manager TM1. However, other than that, the transaction manager TM1 would be done with the transaction. The second transaction manager TM2 would not expect a commit message from TM1. Furthermore, the transaction manager TM2 would not enter a significant in-doubt phase, other that the time taken from the transaction manager TM2 to internally determine whether or not to commit or abort the transaction. Since the in-doubt phase is eliminated or at least shortened, transaction performance is improved.

Extension #3

A third example extension applies when a coordinator (e.g, the first transaction manager TM1) has delegated the responsibility for deciding whether or not to commit or abort the transaction to a participant (e.g., the second transaction manager TM2) as indicated in extension #2 described above. As previously mentioned for extension #2, this may be accomplished using a SinglePhaseCommit message. In this third example extension, the participant (e.g., the second transaction manager TM2) may respond to the SinglePhaseCommit message using an InDoubt message or the like to indicate to the first transaction manager TM1 that the first transaction TM1 is in doubt as to whether or not the transaction is committed or aborted. For example, suppose the second transaction manager TM2 has further delegated the decision making for whether to commit or abort the transaction to yet another computing entity, and the second transaction manager TM2 never receives an indication from that third party on whether or not the transaction is to be committed or aborted, the second transaction manager TM2 may after some time communicate the InDoubt message to the first transaction manager TM1.

Extension #4

If the second transaction manager TM2 were to somehow lose track of state information regarding a transaction, or lose track of whether or not a transaction had been committed or aborted, the second transaction manager TM2 could follow the conventional WS-AT protocol by transmitting a Replay message to the first transaction manager TM1. The first transaction manager TM1 could then provide any state information for the transaction if the transaction was open, or could provide a determination on whether or not the transaction was committed or aborted if the transaction was not in process.

However, this conventional Replay message only allows for the identification of one transaction. If there were many different transactions that the second transaction manager TM2 needs a replay for, a replay message would be sent for each transaction. The fourth example extension allows for a single replay message to include an identification of more than one transaction. The first transaction manager TM1 would then send appropriate state or status information for each transaction. The replay message may even just indicate a replay is desired for all transactions that were open within a certain time period. This extension improves performance during recovery, particularly if there are potentially multiple concurrent transactions.

Extension #5

The fifth example extension supplements the information that may be included in the CreateCoordinationContext message. The message may be extended to include any information useful for the transaction. For example, the CreateCoordinationContext message may include human-readable information that administrators could access for information regarding the transaction. The CreateCoordinationContext may also include an isolation level parameter that represents how resource managers (such as databases) should lock resources and how the resources should react when multiple transactions access their resources concurrently.

This extension may also allow such transaction-specific information to be included in the CoordinationContext object. This would allow any computing entity that would normally be able to interpret the CoordinationContext object to also have access to the transaction specific information.

Such transaction specific information may even include mechanisms or bindings that allow a computing entity to register in a transaction governed by a transaction protocol other that WS-AT. Such bindings may include, for example, OleTx or TIP. A recipient of the CoordinationContext object may then use the bindings provided in the CoordinationContext object to not only register in a transaction, but also to select the transaction protocol to be used in accomplishing the transaction.

Extension #6

Another extension permits context information within the Endpoint reference to include additional information such as, for example, an identification of the current transaction and/or an identification of other transactions in process along with information that is relevant to whether or not the transaction has been properly concluded (e.g., through being committed or aborted). The Endpoint reference is defined by the WS-Addressing specification, and is included in all of the CreateCoordinationContextResponse, Register, and RegistrationResponse message defined by the WS-Coordination protocol. This information would allow the participant or coordinator to detect "amnesia" regarding a transaction.

It is always possible that even the most reliable of computing entities could lose track of a transaction. In order to detect amnesia, a computing entity desiring future detection of amnesia may insert information regarding the transaction into the ReferenceParameters object stored in the Endpoint Reference defined by WS-Addressing. This state information will be returned to the computing entity in the ReplyTo header in future communications involving the transaction. The computing entity may then use this information to identify whether or not the computing entity is aware of the transaction; and if the transaction is not aware of the transaction, whether or not the lack of awareness is due to the proper conclusion of the transaction or whether it is due to an unwanted forgetting of transactions in process (i.e., amnesia). If amnesia has occurred, the computing entity may then perform appropriate action to recover such as, for example, notifying a user or administrator of the amnesia.

Extension #7

Another extension permits for the generation of a CoordinationContext by being provided an identifier to a transaction that is not currently governed by WS-AT. For example, suppose that there is an existing OleTx transaction in process. Now suppose that a participant in the transaction desires to extend the transaction using WS-AT. In order to do so, the participant needs a CoordinationContext object to pass to other desired participants. The participant may generate a request (which may optionally be a CreateCoordinationContext request) for such a CoordinationContext object. The CoordinationContext object is returned, whereupon it is passed to any remote application that is to also participate in the transaction. The other participants may then use that CoordinationContext object to register in the transaction.

Accordingly, the principles of the present invention allow for the efficient negotiation of a transport-agnostic coordination protocol to be used to accomplish a distributed activity. The principles of the present invention also provide for some advantageous extensions to the existing WS-Coordination and WS-AT protocols that provide for improved performance, accuracy, and interoperability.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In an environment that includes a first computing entity and a second computing entity that are capable of communicating with each other using a message exchange protocol that is extendible, a method for the first computing entity to negotiate one or more extensions to the message exchange protocol to be used in communicating using a message exchange with the second computing entity, the method comprising the following:

an act of the first computing entity constructing first one or more protocol extension-identifying data structures that identify a first set of one or more extensions that the first computing entity is capable of implementing when communicating in a message exchange pattern with the second computing entity;

an act of the first computing entity constructing a first message, the first message including the first one or more protocol extension identifying data structures;

an act of the first computing entity providing the first message to the second computing entity;

an act of the first computing entity receiving a second message from the second computing entity;

an act of the first computing entity determining whether there is second one or more protocol extension-identifying data structures included in the second message that identify a second set of one or more extensions that the second computing entity is capable of implementing when communicating in the message exchange pattern with the first computing entity;

an act of the first computing entity identifying that the message exchange pattern without extensions will be used in the message exchange protocol when there is an absence of the second one or more protocol extension-identifying data structures in the second message; and an act of the first computing entity identifying third one or more extensions that are actually to be used in the message exchange based on the first one or more extensions and the second one or more extensions when the second one or more protocol extension-identifying data structures exists in the second message.

2. A method in accordance with claim 1, wherein the first message also includes a request to initiate a distributed activity, and the second message also includes a response to the request to initiate the distributed activity.

3. A method in accordance with claim 2, wherein the request is a CreateCoordinationContext request as defined by the WS-Coordination protocol, and the response is a CreateCoordinationContextResponse message as defined by the WS-Coordination protocol.

4. A method in accordance with claim 3, wherein the message exchange protocol permits for the inclusion of information in an Endpoint reference that permits correlation between the information and a transaction that governs the distributed activity, or a specific enlistment in the transaction.

5. A method in accordance with claim 3, wherein the message exchange protocol permits for the inclusion of information in an Endpoint reference that identifies one or more currently pending transactions.

6. A method in accordance with claim 3, wherein the message exchange protocol permits additional information to be included in the CreateCoordinationContext request.

7. A method in accordance with claim 6, wherein the additional information includes an isolation parameter to be applied for the distributed activity.

8. A method in accordance with claim 3, wherein the message exchange protocol permits additional information to be included in a CoordinationContext message provided in the CreateCoordinationContextResponse message.

9. A method in accordance with claim 8, wherein the additional information includes a binding to a transaction protocol other than WS-AT.

10. A method in accordance with claim 3, wherein the request further includes registration information normally included within a Register request as defined by the WS-Coordination protocol, and the response includes registration response information included within a RegistrationResponse message as defined by the WS-Coordination protocol.

11. A method in accordance with claim 2, wherein the message exchange protocol allows for either a two-phase prepare/commit transaction or permits delegation of decision making for committing the transaction.

12. A method in accordance with claim 11, wherein the message exchange protocol allows for a second transaction manager to indicate to a first transaction manager that the second transaction manager is in doubt as to a status of the transaction in response to the first transaction manager instructing the second transaction manager to prepare the transaction and then commit the transaction.

13. A method in accordance with claim 2, wherein the message exchange protocol permits a single replay message from a second transaction manager to identify multiple transactions for which replay is desired.

14. A method in accordance with claim 2, wherein the request is a CreateCoordinationContextResponse message as defined by the WS-Coordination protocol.

15. A method in accordance with claim 2, wherein the request is a Register request as defined by the WS-Coordination protocol.

16. A method in accordance with claim 1, wherein the message exchange protocol permits for the generation of a CoordinationContext object based on an existing transaction that implements a transaction protocol other that WS-AT.

17. In an environment that includes a first computing entity and a second computing entity that are capable of communicating with each other using a message exchange protocol that is extendible, a method for the second computing entity to negotiate one or more extensions to the message exchange protocol to be used in communicating using a message exchange with the first computing entity, the method comprising the following:

an act of the second computing entity receiving a first message from the first computing entity, the first message including first one or more protocol extension-identifying data structures that include information identifying a first set of one or more extensions that the second computing entity is capable of implementing when communicating in a message exchange pattern with the first computing entity;

an act of the second computing entity constructing second one or more protocol extension-identifying data structures that identify a second set of one or more extensions that the second computing entity is capable of implementing when communicating in the message exchange pattern with the first computing entity;

an act of the second computing entity constructing a second message including the second one or more protocol extension-identifying data structures;

an act of the second computing entity providing the second message to the first computing entity;

an act of the second computing entity reading the first one or more extension protocol identifying data structures from the first message; and an act of the second computing entity identifying one or more extensions that are actually to be used in the message exchange based on the first one or more extensions and the second one or more extensions.

18. A computer program product for use in an environment that includes a first computing entity and a second computing entity that are capable of communicating with each other using a message exchange protocol that is extendible, the computer program product not consisting of a propagated data signal and comprising one or more computer-storage media, wherein the media does not consist of a signal, having stored thereon computer-executable instructions that, when executed by one or more processors, causes the first computing entity to perform a method for the first computing entity to negotiate one or more extensions to the message exchange protocol to be used in communicating using a message exchange with the second computing entity, the method comprising the following:

an act of the first computing entity constructing first one or more protocol extension-identifying data structures that identify a first set of one or more extensions that the first computing entity is capable of implementing when communicating in a message exchange pattern with the second computing entity;

an act of the first computing entity constructing a first message, the first message including the first one or more extension identifying data structures;

an act of the first computing entity providing the first message to the second computing entity;

an act of the first computing entity receiving a second message from the second computing entity;

an act of the first computing entity determining whether there is second one or more protocol extension-identifying data structures included in the second message that identify a second set of one or more extensions that the second computing entity is capable of implementing when communicating in the message exchange pattern with the first computing entity;

an act of the first computing entity identifying that the message exchange pattern without extensions will be used in the message exchange protocol when there is an absence of the second one or more protocol extension-identifying data structures in the second message; and identifying third one or more extensions that are actually to be used in the message exchange based on the first one or more extensions and the second one or more extensions when the second one or more protocol extension-identifying data structures exists in the second message.

19. A computer program product for use in an environment that includes a first computing entity and a second computing entity that are capable of communicating with each other using a message exchange protocol that is extendible, the computer program product not consisting of a propagated data signal and comprising one or more computer-storage media, wherein the media does not consist of a signal, having stored thereon computer-executable instructions that, when executed by one or more processors, causes the second computing entity to perform a method for the second computing entity to negotiate one or more extensions to the message exchange protocol to be used in communicating using a message exchange with the first computing entity, the method comprising the following:

an act of the second computing entity receiving a first message from the first computing entity, the first message including first one or more protocol extension-identifying data structures that include information identifying a first set of one or more extensions that the second computing entity is capable of implementing when communicating in a message exchange pattern with the first computing entity;

an act of the second computing entity constructing second one or more protocol extension-identifying data structures that identify a second set of one or more extensions that the second computing entity is capable of implementing when communicating in the message exchange pattern with the first computing entity;

an act of the second computing entity constructing a second message including the second one or more protocol extension-identifying data structures;

an act of the second computing entity providing the second message to the first computing entity;

an act of the second computing entity reading the first one or more protocol extension identifying data structures from the first message; and an act of the second computing entity identifying one or more extensions that are actually to be used in the message exchange based on the first one or more extensions and the second one or more extensions.

* * * * *